No. 632,137. Patented Aug. 29, 1899.
J. MORRISS.
DEVICE FOR TEACHING MUSIC.
(Application filed Aug. 25, 1897.)
(No Model.) 2 Sheets—Sheet 2.
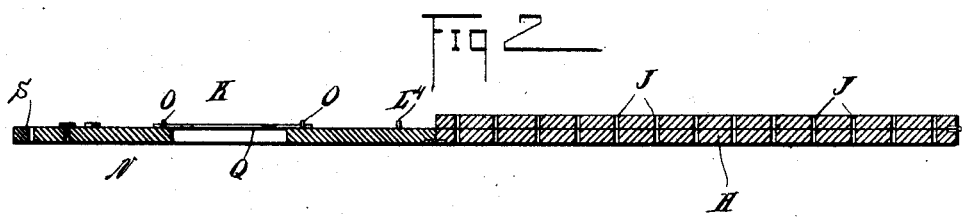
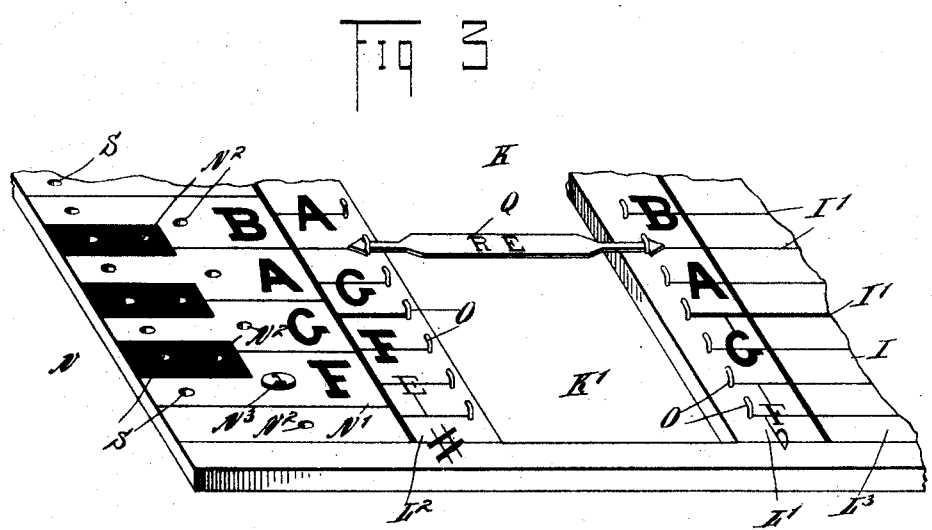

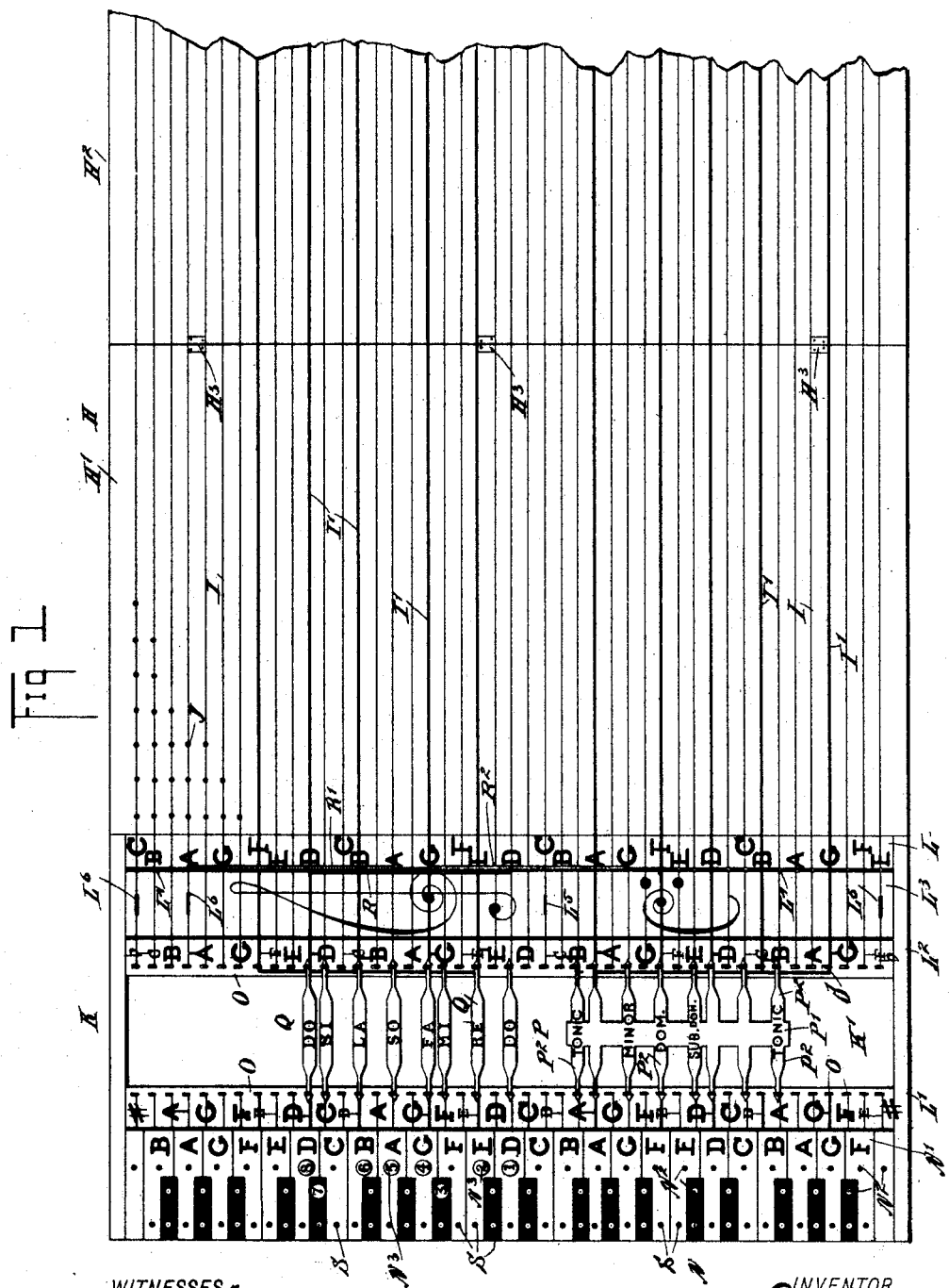

UNITED STATES PATENT OFFICE.

JOHNSON MORRISS, OF MARSHALL, TEXAS.

DEVICE FOR TEACHING MUSIC.

SPECIFICATION forming part of Letters Patent No. 632,137, dated August 29, 1899.

Application filed August 25, 1897. Serial No. 649,483. (No model.)

*To all whom it may concern:*

Be it known that I, JOHNSON MORRISS, of Gateshead-on-Tyne, England, at present residing in Marshall, in the county of Harrison and State of Texas, have invented new and useful Improvements in Devices for Use in Teaching Music, of which the following is a full, clear, and exact description.

The object of the invention is to provide certain new and useful improvements in the art of teaching music whereby elementary music in any key can be readily and successfully taught to beginners and students of music.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a face view of the improvement. Fig. 2 is a sectional side elevation of the same. Fig. 3 is an enlarged perspective view of part of the modulator, and Fig. 4 is a perspective view of part of the holder for the note-arrows.

The improved apparatus, as illustrated in the drawings, is provided with a staff-board H, preferably made in sections H' and H², connected with each other by hinges H³ to fold one section upon the other when the device is not in use.

On the face of the staff-board H are arranged lines I and I', of which the lines I' are preferably made heavier than the lines I, so as to readily contrast with the same, the lines I' being the staff-lines and the lines I the ordinary note-lines. The lines I are arranged parallel one to the other and placed equal distances apart, each line representing a semitone in music. The staff-lines I' are not equal distances apart for indicating greater interval in sound, as hereinafter more fully described.

On the staff-board H on the lines I I' are formed recesses or apertures J, adapted to be engaged by pegs carrying the ordinary music characters, so as to display the same according to a given exercise on the staff-board H.

On one side of the staff-board H is hinged or otherwise secured a modulator K, formed with columns L, L', and L², arranged transversely to the lines I I', which latter extend through the said columns. The column L contains the pitch-names of all lines and spaces in the tonal compass of the modulator, and the column L' contains the names of all the sharps occurring within the tonal compass of the modulator and staff-board. The practical sharps or the black keys are distinguished by black heavy-faced type letters, while the inharmonics or theoretical sharps are indicated by smaller colored letters. A small perpendicular line connects the letter with the line upon which it is written when its tone position is higher or lower than that of the corresponding line. The column L² is similar to the column L', the only difference being that the said column contains all the flats instead of the sharps.

The columns L' and L² are separated from each other by an opening K' in the modulator K, and between the columns L and L² is arranged a column L³, which contains the treble and bass clef signatures F and G, colored tone-lines, added lines A and C above the G clef, middle line C, and E below the F clef. At one side of the column L' is arranged a keyboard-column N, representing the white and black keys of a pianoforte and in alinement with the lines I I' and the music characters in the columns L, L', and L². The white keys of the keyboard-column N are indicated by their musical names N', as plainly indicated in Fig. 1, while the black keys can be readily read from the characters in the columns L' and L².

On the modulator K, along the adjacent edges of the columns L' and L², are arranged staples, hooks, or the like fastening or supporting devices O, arranged in alinement with the lines I I' and adapted to removably support a tone-ladder P and number of arrows Q, as shown in the drawings. The tone-ladder P consists of a standard or middle piece P', from which extend right and left to the columns L' and L² the arms P², placed suitable distances apart to represent the whole tones and half-tones or steps and half-steps of a major diatonic scale, the arms being provided with the words "Tonic," "Minor," "Dom.," "Sub Dom.," and "Tonic," or other words, as may be desired, the tonic being at the two outermost arms P².

As indicated in the drawings, the top and bottom arms P², marked "Tonic," indicate on the characters B-flat, thus illustrating the key or scale of B-flat, with its minor, dominant, and subdominant scales. As the ladder P is adjustable on the modulator, it can be placed in any desired position, so as to indicate any desired key or scale, it being understood that the arms P² are brought in alinement with the corresponding musical characters in the columns L' and L². The arms P² also point to the keys on the keyboard-column N used in playing the scale, also tone-lines I and I'. The note-arrows Q are preferably made in seven different colors and are adapted to be supported by the hooks O to indicate a desired scale or chord. For instance, as shown, the note-arrows indicate the scale of D, with the intervals of a major diatonic scale. The note-arrows preferably bear the ordinary legends in general use (do, re, mi, fa, sol, la, si, do, with chromatics) in teaching sight reading and singing, and when detached can be used to fill up any major or minor scale or any desired chord.

On the lines separating the columns L and L³ from each other are arranged pins or pegs L⁴ on the lines I I' for supporting movable scale-strips R, R', and R² for designating the position on the staff of the keyboard-column of the scale of tonic, dominant, and subdominant of any key known. The scale-strips are preferably made of different colors. For instance, the strip R is preferably made red to designate the tonic, the strip R' is colored blue to represent the dominant, and the strip R² is yellow to represent the subdominant, of the key of D merely for illustration.

On the keys represented in the keyboard-column N are formed openings or recesses N², adapted to receive and support removable buttons N³, preferably numbered, as indicated in Fig. 1, to designate such scale, chord, or exercises as may be desired, or illustrated with the note-arrows Q, as before mentioned. As shown in Fig. 1, the buttons N³ are numbered successively and designate the scale of D. On the keys of the keyboard-column N is arranged a row of apertures S, each adapted to receive a button connected with an autophonic attachment which gives the tone of the key under which it is placed arranged at the rear of the modulator K and consisting of bells, gongs, or other sound-producing instruments actuated by the corresponding buttons. The note-arrows Q may be placed in a frame or a holder T, formed with compartments or recesses T', located one above the other and representing semitones in music, each compartment being adapted to receive a note-arrow Q. Now by the use of this holder and the note-arrows any scale or chord can be illustrated, rising and falling by semitones. The note-arrows are preferably slipped in at the sides of the compartments T' and are prevented from falling out by cords or wires T², strung over the face of the holder, as plainly indicated in Fig. 4.

In the column L³ are arranged tone-lines L⁵, preferably colored identically with the lines I I', the inharmonics B, C and E, F differing in color from the line at the middle C, the staff, and the other lines. In the column L³ are further placed added or leger lines L⁶. The lines I in both the staff-board H and modulator K are preferably of different colors, and the staff-lines I' for the musical characters G and B and F and A in the bass clef and G and B in the treble clef are placed greater distances apart than the distances between the remaining lines to indicate greater intervals in sound, the intervals between the lines specified by the above letters being major thirds and minor thirds. The staff-lines are preferably made black, the inharmonics B, C and E, F yellow, and the remaining lines blue, with the line at middle C red.

The rack shown in Fig. 4 is a device for holding the detached note-arrows Q. It may be made any length and answers approximately a purpose equivalent to that of the standard P' of the tone-ladder. Each notch or division of the rack is equivalent to a semitone on the modulator. The note-arrows are placed in the notches in such position that they will illustrate the chord or scale desired. For instance, take the common chord 1, 3, 5 of any key. Now the arrow marked "Do" would be placed in, say, the bottom notch or division of the holder. Three notches would then be left vacant and the note-arrow marked "Mi" placed in the fifth notch. Two other notches will then be skipped and the note-arrow marked "So" placed in the eighth notch. The rack, with the arrows, will then represent common chord 1, 3, 5 of any key. The rack then placed on the modulator with, say, the note-arrow do on the hook parallel with pianoforte-key C would show chord C, E, G of the key of C major. Upon raising one semitone (or hook) the common chord C-sharp, E-sharp, G-sharp would then be indicated. It will be seen, therefore, by this example that the rack containing this combination of note-arrows will indicate the common chord 1, 3, 5 of the pianoforte-key on the modulator upon which the note-arrow do is placed. Any other chord used in music or any scale major or minor can be shown in the same way by the use of the holder or rack with the detached note-arrows. In the example cited the note-arrow do represents the tonic, mi the mediant, and so the dominant of any key on the modulator upon the hook of which the note-arrow do rests.

Now it will be seen that by the arrangement described it is evident that any desired scale or exercise can be ocularly demonstrated to the student or beginner.

It should be understood that the note-arrows, tone-ladder, and scale-strips are placed in the positions which they occupy in the drawings merely for purposes of illustration.

Having thus fully described my invention, I claim as new and desire to secure by Letters Patent—

1. In a device for use in teaching music, the combination with the modulator provided with columns containing characters indicating every semitone and tone within the tonal compass of the modulator and also provided with rows of hooks adjacent said characters, of a tone-ladder provided with arms arranged to engage with said hooks and arranged to indicate the steps in the diatonic scales of the characters in the columns, as and for the purpose set forth.

2. In a device for use in teaching music, the modulator provided with three columns one of which contains characters representing the pitch-names of all the tones in the compass of the modulator and the other two columns being spaced apart and the one containing characters indicating the sharps and the other characters indicating the flats of the notes within the compass of the modulator and a series of note-arrows each independent of the others, the said arrows being adjustably held between the last spaced-apart columns at any desired intervals whereby to indicate the tones contained in any desired scale or chord, as and for the purpose set forth.

3. In a device for use in teaching music, the modulator provided with three columns, one of which contains characters representing the pitch-names of all the tones in the compass of the modulator and the other two columns being spaced apart and containing, one, characters indicating the sharps, and the other, characters indicating the flats, of the notes within the compass of the modulator, a tone-ladder adjustably held on the modulator between the spaced-apart columns and arranged to indicate the tonic and other steps in the major diatonic scale of the note adjacent which its ends are placed, and series of note-arrows each independent of the others, the said arrows being adjustably held on the modulator between the spaced-apart columns and at any desired intervals whereby to illustrate the notes occurring in the different diatonic steps illustrated by the tone-ladder, as and for the purpose set forth.

4. In the device for use in teaching music, the modulator provided with a keyboard-column containing representations of the keys of a pianoforte and two columns in alinement with said keyboard-column and containing characters representing respectively the sharps and flats of the keys on said keyboard, and rows of apertures, the apertures of one row being arranged one on each representation of a white and black key and adapted to receive buttons whereby to indicate the sequence of any chord or scale and the other row being adapted to receive means for operating an autophone attachment, as and for the purpose set forth.

5. An apparatus for teaching music, comprising a staff-board having spaced parallel lines and apertures in the said lines to support music characters, a modulator arranged on one side of the said staff-board and provided with scale-columns arranged transversely to the said lines and having their scale characters indicating the corresponding lines on the staff-board, a tone-ladder held adjustably on the said modulator and formed with spaced arrows representing a scale and indicating on the characters in the said columns, a set of note-arrows held adjustably on the said modulator and indicating on the scale characters in the said columns and a keyboard-column on the said modulator and having its key representations in alinement with the said staff-lines, substantially as shown and described.

6. An apparatus for teaching music, comprising a staff-board having spaced parallel lines and apertures in the said lines to support music characters, a modulator arranged on one side of the said staff-board and provided with scale-columns arranged transversely to the said lines and having their scale characters indicating the corresponding lines on the staff-board, a tone-ladder held adjustably on the said modulator and formed with spaced arrows representing a scale and indicating on the characters in the said columns, a set of note-arrows held adjustably on the said modulator and indicating on the scale characters in the said columns and a keyboard-column on the said modulator and having its key representations in alinement with the said staff-lines, and numbered pegs for insertion on the said keyboard to indicate a scale, chord or exercise, substantially as shown and described.

7. In a device for use in teaching music, the staff-board provided with a series of spaced parallel lines representing semitones, a modulator arranged alongside of said staff-board and provided with a column extending transversely to said lines and containing characters representing the pitch-names of all the tones in the compass of the staff-board, the said modulator being further provided with a pin in horizontal alinement with each line and scale-strips arranged to be secured on said pins whereby to indicate the scales of different keys, as and for the purpose set forth.

8. An apparatus for teaching music, comprising a staff-board having spaced parallel lines and apertures in the said lines to support music characters, a modulator arranged on one side of the said staff-board and provided with scale-columns arranged transversely to the said lines and having their scale characters indicating the corresponding lines on the staff-board, a tone-ladder held adjustably on the said modulator and formed with spaced arrows representing a scale and indicating on the characters in the said columns, a set of note-arrows held adjustably on the said modulator and indicating on the scale characters in the said columns and a keyboard-column on the said modulator and having its key representations in alinement with the said staff-lines, and adjustable scale-strips for the said columns and keyboard for designating the position of the scales of tonic, dominant and subdominant of any key-note, substantially as shown and described.

9. An apparatus for teaching music, provided with a modulator comprising spaced-apart columns containing scale characters and a set of note-arrows each independent of the others and held adjustably on the modulator between the said columns and indicating on the scale characters in the said columns to represent any desired scale or chord, substantially as shown and described.

10. An apparatus for teaching music, provided with a rack and a set of note-arrows adapted to be placed in the said rack to indicate any scale or chord rising and falling by semitones, substantially as shown and described.

JOHNSON MORRISS.

Witnesses:
  DAN W. DEUPREE,
  W. C. FEILD.